(12) United States Patent
Satake (10) Patent No.: US 6,430,374 B1
(45) Date of Patent: Aug. 6, 2002

(54) RATCHETING DIOPTER ADJUSTMENT DEVICE

(75) Inventor: Hiroyuki Satake, Musashino (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 09/551,022

(22) Filed: Apr. 17, 2000

(30) Foreign Application Priority Data

Apr. 21, 1999 (JP) ............................................. 11-113941

(51) Int. Cl.[7] ........................ G03B 13/02; G03B 13/10; G03B 17/00
(52) U.S. Cl. ........................ 396/373; 396/379; 396/543
(58) Field of Search .............................. 396/148, 373, 396/378, 382, 386, 543, 299, 379; 359/823, 826

(56) References Cited

U.S. PATENT DOCUMENTS

| | | | |
|---|---|---|---|
| 4,712,897 A | * 12/1987 | Crema ........................ 396/373 |
| 5,790,908 A | * 8/1998 | Matsuda ...................... 396/379 |
| 5,950,035 A | * 9/1999 | Sakamoto et al. .......... 396/543 |
| 6,006,038 A | * 12/1999 | Kosaka ........................ 396/29 |

FOREIGN PATENT DOCUMENTS

JP       1-291227      11/1989

\* cited by examiner

*Primary Examiner*—Russell Adams
*Assistant Examiner*—Arthur A Smith
(74) *Attorney, Agent, or Firm*—Ostrolenk, Faber, Gerb & Soffen, LLP (57) ABSTRACT

In a finder apparatus, a diopter adjusting knob for driving an eyepiece back and forth is supported by a shaft portion of a main body. A plurality of V-shaped ratcheting grooves are disposed in a direction orthogonal to a parting line caused by molding under the shaft portion of the main body. The diopter adjusting knob is ratchetingly adjusted when a ball supported on a diopter adjusting knob slides in contact with the V-shaped grooves. The main body can be molded using simple dies without slides because the V-shaped grooves are orthogonal to the parting line.

38 Claims, 5 Drawing Sheets

RATCHETING DIOPTER ADJUSTMENT DEVICE

BACKGROUND OF THE INVENTION

1. Field of the Invention

The present invention relates to a ratcheting device and more particularly to a diopter adjustment device.

2. Related Art Statement

A diopter adjusting mechanism incorporating a ratchet device for locating the position of a diopter adjusting dial has been disclosed in Japanese unexamined patent publication No. H1-291227. This diopter adjusting mechanism has a rotatable cylindrical cam ring integral with an adjusting dial for diopter adjustment. A series of grooves are provided on the outer circumference of the cam ring, and a ratchet ball is disposed in such a manner that it always contacts and slides on the groove like a pawl. When the adjusting dial is rotated, the position of the dial can be located with the ratchet device.

However, the ratchet device incorporated in the above-described diopter adjusting mechanism makes it difficult to configure an apparatus like a camera with a small size because the ratchet grooves provided on the cylindrical cam ring increase the space occupied by the device.

Other conventional ratchet devices constituted by a rotary member occupying a ball space and having simple structures include ratchet devices having a ratchet ball provided on a rotary member such that it moves to draw an arcuate locus on a plane and having ratchet grooves provided on a fixed member on which the ball slides. The grooves of such a ratchet device are disposed in a radial configuration on a plane of the fixed member.

In the case of the above-described ratchet device, however, the area of the fixed member where the grooves are formed must be released from the molding die in which it is formed in a direction orthogonal to the plane of the grooves because the grooves are disposed in a radial configuration. This makes it necessary to use a slide die and can reduce productivity.

SUMMARY OF THE INVENTION

The present invention has been conceived to solve the above-described problem, and it is an object of the invention to provide a ratchet device which has a simple structure, whose components can be easily manufactured and which can be made compact.

According to an aspect of the invention, there is provided a ratchet device having a rotary member rotated about a rotary shaft, a base member for rotatably supporting the rotary member, a contact member provided between the rotary member and base member and an urging member. The base member has a plurality of linear ratcheting grooves which are provided on a surface orthogonal to the rotary shaft and which extend in parallel with each other.

In the ratchet device, the rotary member is in contact with the contact member which is in contact with the grooves for ratcheting movement. When the rotary member is rotated, the contact member moves over the grooves resulting in a ratcheting operation.

According to another aspect of the invention, there is provided a ratchet device having a rotary member rotated about a rotary shaft, a base member for rotatably supporting the rotary member, a contact member provided between the rotary member and base member and an urging member. The base member is formed using injection molding, such that the parting line forced during the injection molding process passes through the center of the rotary shaft. The base member has ratcheting grooves forming part of the ratchet mechanism. The grooves are parallel linear grooves which are provided on a surface orthogonal to the rotary shaft so as to be orthogonal to the parting line. The urging member urges the rotary member into contact with the contact member which is in turn urged into contact with the ratchet grooves.

In the ratchet device, when the rotary member is rotated, the contact member moves over the ratchet grooves, resulting in a ratcheting operation.

According to still another aspect of the invention, there is provided a ratcheting device for a camera having a manually operated operating member, a molded ratcheting member having ratcheting grooves and a contact member sliding in contact with the ratcheting grooves as the operating member is rotated. The ratcheting grooves on the ratcheting member are provided on a surface extending perpendicular to a parting line on the ratcheting member which is created during the molding operation.

In the ratchet device for a camera, when the operating member is rotated, the contact member moves across the grooves, resulting in a ratcheting operation.

DETAILED DESCRIPTION OF THE PREFERRED EMBODIMENTS

Preferred embodiments of the invention will now be described with reference to the drawings.

Figure 1:
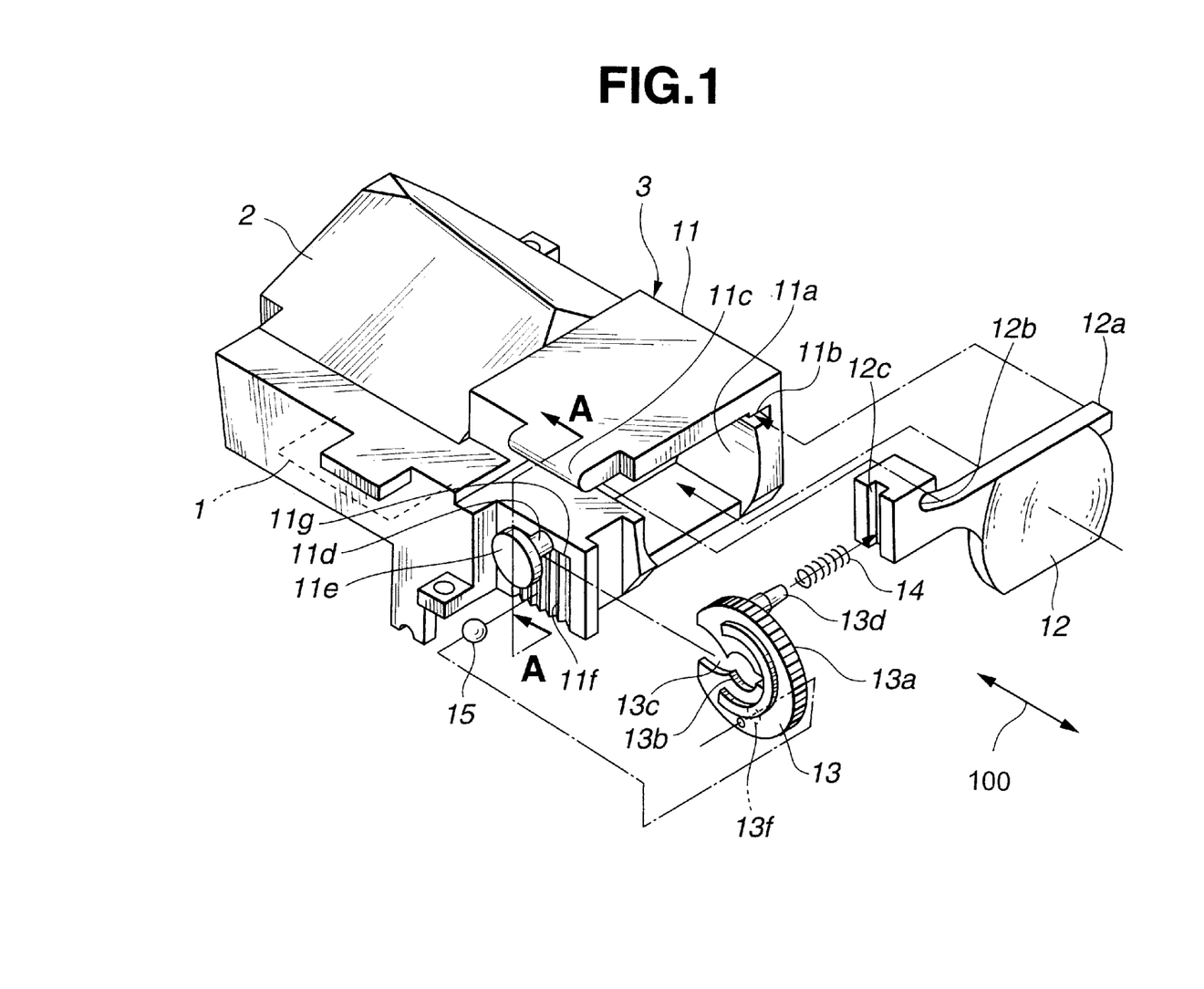
FIG. 1 is an exploded perspective view of a finder apparatus incorporating a ratchet device which is a first embodiment of the invention.
Figure 2:
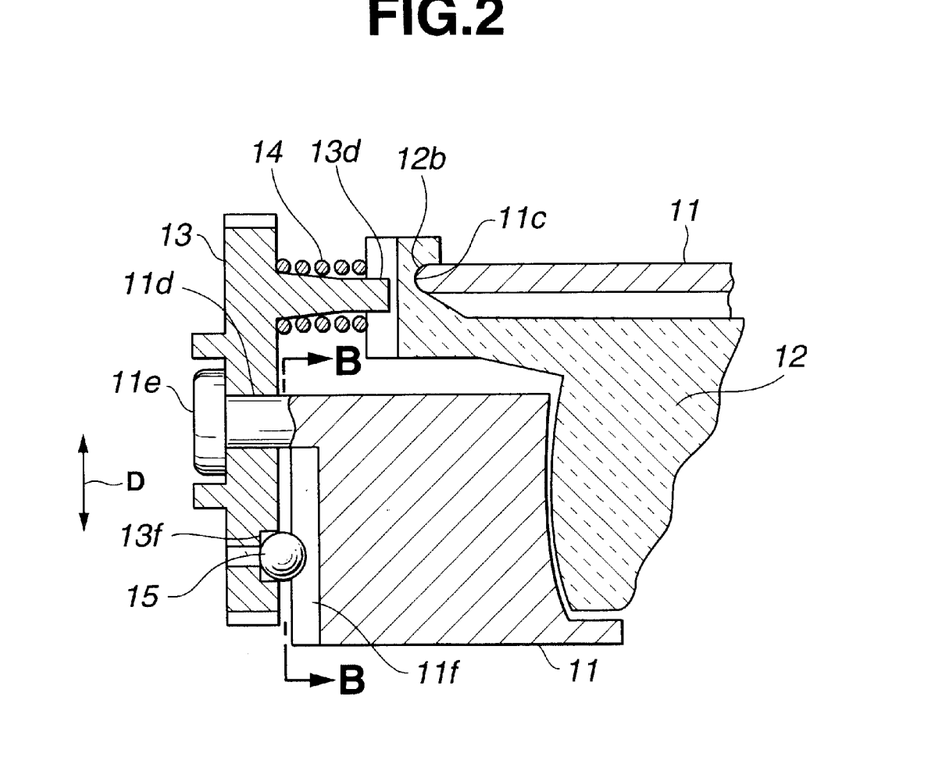
FIG. 2 is a sectional view taken along the line A—A in FIG. 1 and showing a section in the region of a diopter adjusting knob.
Figure 3:
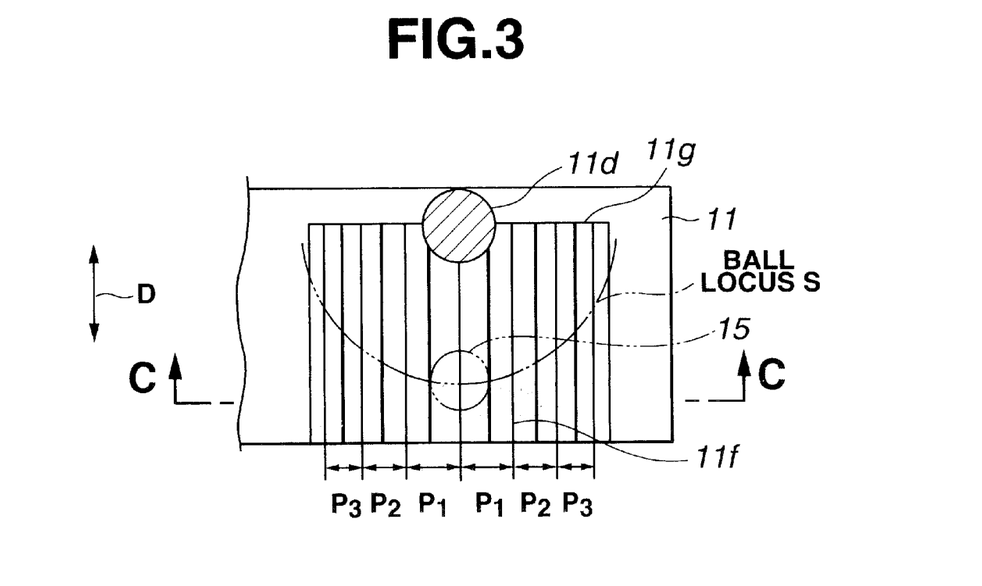
FIG. 3 is a sectional view taken along the line B—B in FIG. 2 and showing disposal of V-shaped grooves provided on the main body.
Figure 4:
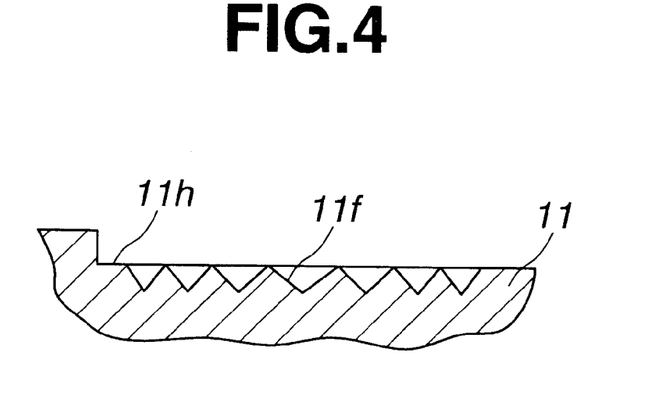
FIG. 4 is a sectional view taken along the line C—C in FIG. 3 and showing a sectional configuration of the V-shaped grooves.

FIG. 1 is an exploded perspective view of a view finder apparatus incorporating a ratchet device which is a first embodiment of the invention. FIG. 2 is a sectional view taken along the line A—A in FIG. 1 showing a section in part of a ratchet device in the finder apparatus. FIG. 3 is a sectional view taken along the line B—B in FIG. 2, and FIG. 4 is a section taken along the line C—C in FIG. 3, each of them showing a configuration of ratchet grooves forming part of the ratchet device.

The finder apparatus of the present embodiment is formed by a screen portion 1, a Dachkant prism portion 2 and a finder eyepiece portion 3. The ratchet device is incorporate in the finder eyepiece portion 3.

The finder eyepiece portion 3 is formed by a main body 11 which is a base member (frame member), an eyepiece 12 having a finder optical axis 100, a diopter adjusting knob 13 which is a rotary member (operating member), an urging spring 14 for urging the eyepiece 12 and a spherical ball 15 which is a contact member attached to the adjusting knob 13.

On the main body 11, there is provided a lens hole 11a into which the eyepiece is inserted, a guide groove 11b and a semi-cylindrical projection 11c facing each other and extending in parallel in the direction of the optical axis 100, a shaft portion 11d having a flange 11e located under the projection 11c and a plurality of V-shaped grooves 11f located under the shaft portion 11d.

After the main body 11 is molded, the die is released in the vertical direction D shown in FIGS. 2 and 3, and a mold parting line 11g in the vicinity of the shaft portion 11d is formed which runs orthogonal to the direction D.

The plurality of linear V-shaped grooves 11f having a V-shaped section at parallel unequal intervals (FIG. 3) are provided on a surface orthogonal to the shaft portion 11d and are orthogonal to the parting line 11g. As detailed later, the ball 15 of the diopter adjusting knob 13 slides across the plurality of V-shaped grooves 11f, in contact therewith, along a ball locus S in the form of an arc about the shaft portion 11d.

Pitches P1 through P3 (pitches in the direction of the parting line) of the plurality of the V-shaped grooves 11f are defined such that divided central angles of the ball 15 describes as the ball 15 travels along the ball locus S for the pitches are equal to each other. The diopter adjusting knob 13 clicks (ratchets) at equal angular intervals, and the pitches P2 and P3 are set smaller than the V-groove pitch P1 located directly under the shaft portion 11d according to their increasing distances from the shaft position.

Provided integrally with the eyepiece 12 (FIG. 1) are a guide pin 12a, a U-shaped groove 12b provided opposite to the guide pin in a direction parallel with the optical axis 100 and a pin slide groove 12c which is provided on the side of the U-shaped groove and which extends in the vertical direction perpendicularly to the optical axis 100.

The diopter adjusting knob 13 is formed with knurl portion 13a on an outer circumferential surface thereof, a fitting hole 13b having an opening portion 13c smaller than the mating hole, a cylindrical projecting 13d and support hole 13f holding the ball 15 in a predetermined position.

Referring to the assembly of the finder eyepiece portion 3, the eyepiece 12 is first inserted into the lens hole 11a of the main body 11. At the same time, the guide pin 12a and the U-shaped groove 12b of the eyepiece are slidably inserted in the guide groove 11b and the projection 11c of the main body, respectively.

The ball 15 is inserted in the support hole 13f, and the diopter adjusting knob 13 with the urging spring 14 attached to the projection 13d mounted by fitting the shaft portion 11d of the main body into the fitting hole 13 while expanding the opening portion 13c with a pressure and by inserting the projection 13d into the pin slide groove 12c of the eyepiece simultaneously such that it can slide in the groove.

When the diopter adjusting knob 13 is rotated in the above-described mounted state, the ball 15 slides along the V-shaped grooves in contact therewith and is held by a predetermined biasing force when located in the valley of each of the V-shaped grooves.

In such a ratcheting operation, the ball 15 must be displaced relative to the peaks and valleys of the V-shaped grooves 11f in the urging direction. While the displacement can be also achieved as a result of slight elastic deformation of the diopter adjusting knob 13, the wall of the main body 11 and the like in the direction in which the ball contacts them, the ball 15 is pre-loaded by the urging spring 14 through the diopter adjusting knob 13 and can be displaced when the diopter adjusting knob 13 is slightly inclined relative to the shaft portion 11d.

Since the eyepiece 12 is urged by the urging spring 14 to be held with the U-shaped groove 12b in contact with the projection 11c, no shake, inclination or the like occurs on it even when it is moved back and forth in the direction of the optical axis 100.

When the diopter adjusting knob 13 of the finder apparatus of the present embodiment having the above-described configuration is rotated, the eyepiece 12 is moved back and forth in the direction of the optical axis 100 to allow diopter adjustment of the eyepiece 12. The ball 15 moves in contact with the V-shaped grooves 11f of the main body 11, and the diopter adjusting knob 13 is ratcheted into discrete positions of rotation where the ball 15 fits in the valleys of the V-shaped grooves.

In the above-described finder apparatus according to the present embodiment, the ratchet device for ratcheting the diopter adjusting knob 13 has a simple structure, and the V-shaped grooves 11f on which the ball 15 of the ratchet device slides in contact therewith has a configuration extending in the direction in which the main body 11 is released from the die (configuration orthogonal to the parting line). This makes it possible to use a simple die having no sliding part or the like and to improve productivity.

A description will now be made on a finder apparatus for a camera incorporating a ratchet device according to a second embodiment of the invention.

Figure 5:
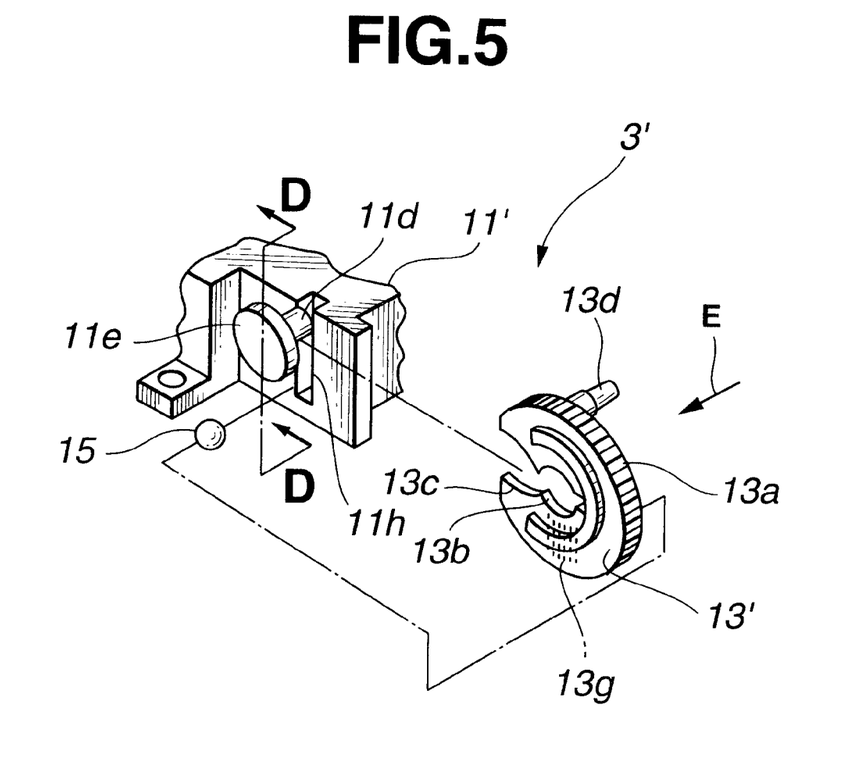
FIG. 5 is an exploded perspective view of a major part in the region of a diopter adjusting knob of a finger apparatus incorporating a ratchet device which is a second embodiment of the invention.
Figure 6:
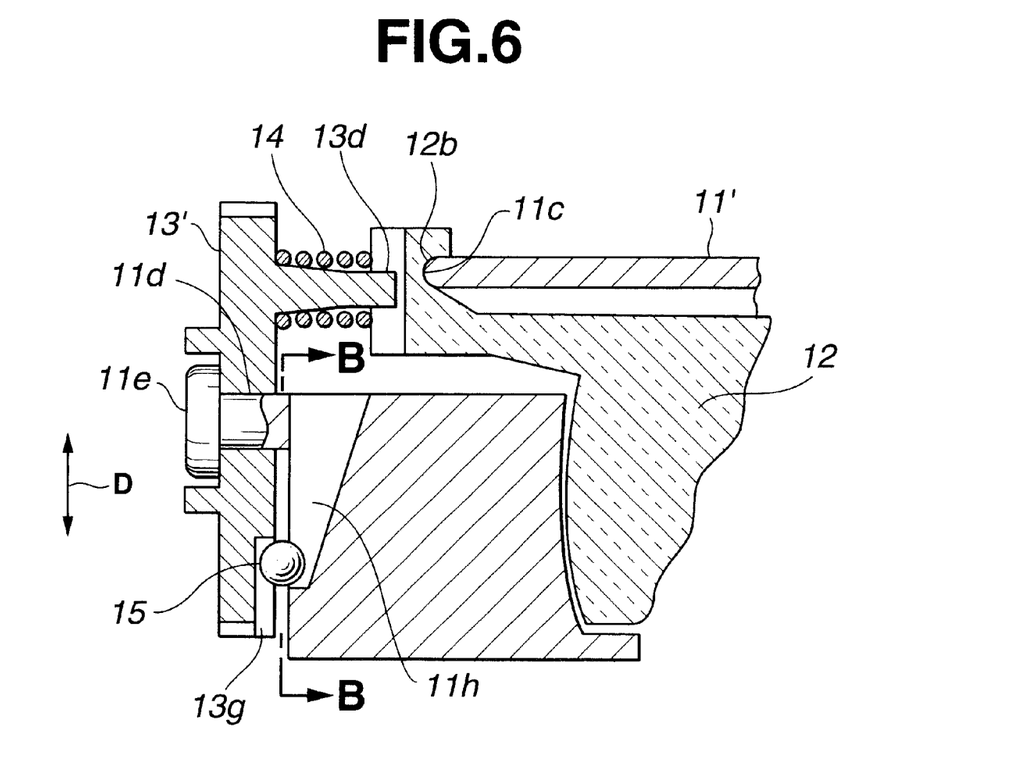
FIG. 6 is a sectional view taken along the line D—D in FIG. 5 and showing a vertical section in part of the region of the diopter adjusting knob.
Figure 7:
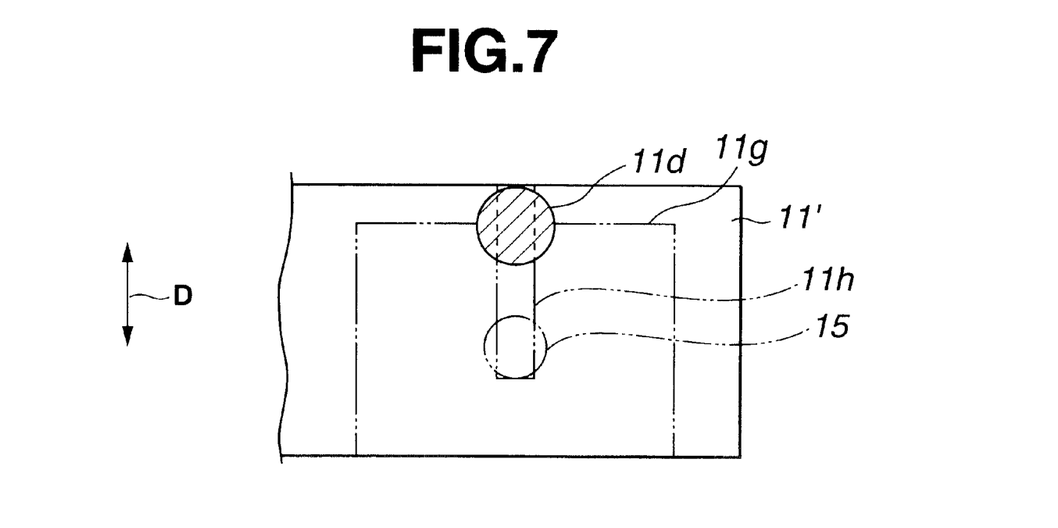
FIG. 7 is a sectional view taken along the line F—F in FIG. 6 and showing disposal of a ball groove provided on the main body.
Figure 8:
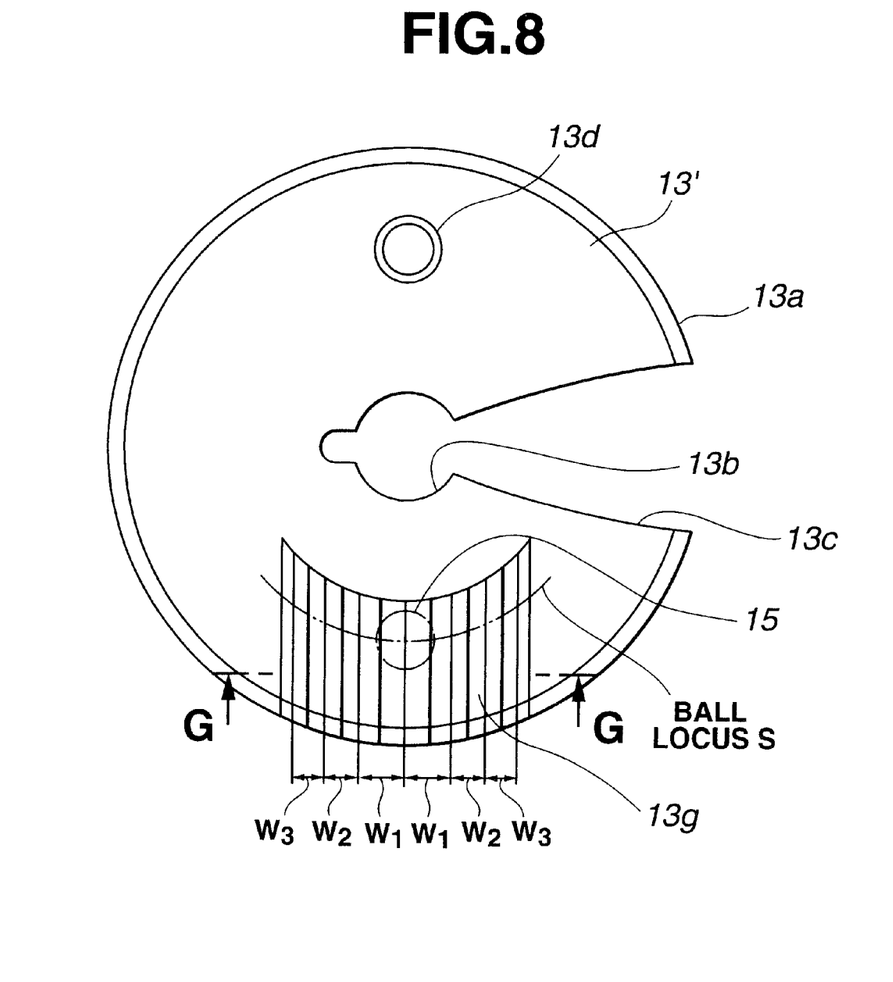
FIG. 8 is a view taken in the direction of the arrow E in FIG. 5 and showing a configuration of the diopter adjusting knob.
Figure 9:
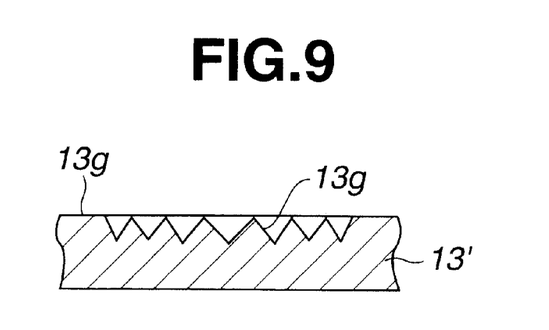
FIG. 9 is a sectional view taken along the line G—G in FIG. 8 and showing a sectional configuration of the V-shaped grooves.

FIG. 5 is an exploded perspective view of the region of a diopter adjusting knob of the finder apparatus for a camera according to the present embodiment. FIG. 6 is a sectional view taken along the line D—D in FIG. 5 showing a vertical section in part of the region of the diopter adjusting knob. FIG. 7 is a sectional view taken along the line F—F in FIG. 6. FIG. 8 is a view taken in the direction of the arrow E in FIG. 5. FIG. 9 is a sectional view taken along the line G—G in FIG. 8.

The finder apparatus of the present embodiment has substantially the same configuration as that of the finder apparatus of the first embodiment. Specifically, it is formed by a screen portion 1 as shown in FIG. 1, a Dachkant prism portion 2 and a finder eyepiece portion 3', and a ratchet device is incorporated in the finder eyepiece portion 3'.

The finder apparatus of the present embodiment is different from the finder apparatus of the first embodiment in the configuration of the ratchet device in the finder eyepiece portion 3'. Specifically, the finder eyepiece portion 3' has a main body 11' as a base member and a diopter adjusting knob 13' as shown in FIG. 5 in addition to an eyepiece 12. The description will be made only on the difference from the finder apparatus of the first embodiment.

No V-shaped groove is disposed on the main body 11' and, instead, a ball groove 11h in which a ball 15 (as a contact member) can fit in contact therewith is provided in a direction orthogonal to a parting line 11g and orthogonal to a shaft portion 11d (see FIGS. 6 and 7). The structure is otherwise the same as that of the main body 11.

The support hole 13f for holding the ball 15 is not provided on the diopter adjusting knob 13' and, instead, a plurality of V-shaped grooves 13g are provided under a fitting hole 13b (FIG. 6) in which the shaft portion 11d is fitted.

As shown in FIGS. 8 and 9, the plurality of linearly extending, parallel V-shaped grooves 13g are formed at unequal intervals. The ball 15 of the diopter adjusting knob 13' slides across the V-shaped grooves 13g in contact therewith along a ball locus S in the form of an arc about the shaft portion 11d.

The pitches W1 through W3 (pitches in a direction orthogonal to the V-shaped grooves) of the plurality of the V-shaped grooves 13g are defined such that divided central angles of the ball locus S for the pitches are equal to each other. Therefore, the diopter adjusting knob 13' ratchets at equal angular intervals, and the pitches W2 and W3 are set smaller than the V-groove pitch W1 of the V-shaped grooves 13g located directly under the shaft portion 11d (fitting hole 13b) according to their increasing distances from the region passing through the center of the shaft portion.

In the ratchet device incorporated in the finder apparatus of the present embodiment having the above-described configuration, when the diopter adjusting knob 13' is rotated, the ball 15 slides across the V-shaped grooves 13g in contact therewith and is held by a predetermined ratcheting force when located in the valley of each of the V-shaped grooves.

In such a ratcheting operation, the ball 15 must be displaced relative to the peaks and valleys of the V-shaped grooves 13g in the urging direction. An urging force is applied to by an urging spring 14 through the diopter adjusting knob 13' and can be displaced when the diopter adjusting knob 13' is slightly inclined relative to the shaft portion 11d as a result of deflection of the urging spring 14.

In the above-described finder apparatus according to the present embodiment, the ratchet device for ratcheting the diopter adjusting knob 13', like the first embodiment, has a simple structure, and the ball groove 11h in which the ball 15 of the ratchet device fits in contact therewith can be formed in a configuration extending in the direction in which the main body 11' is released from the die (configuration orthogonal to the mold parting line). This makes it possible to use a simple die having no sliding part or the like as the die for molding the main body 11' and to improve productivity.

In the first and second embodiments the plurality of V-shaped grooves 11f and 13g are formed as recesses on the surface 11h of the main body 11 or the surface 13h of the diopter adjusting knob 13' as shown in the sectional view in FIG. 4 or 9. The invention is not limited thereto, and the grooves may be provided by forming a plurality of peak portions or projections which rise on the main body surface 11h or knob surface 13h, which provides the same effect.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A ratcheting device comprising:

a rotary member rotatable about a rotary shaft;

a base member for rotatably supporting said rotary member, said member being formed using injection molding such that a parting line caused by the injection molding passes through the center of said rotary shaft, said base member having ratcheting grooves constituted by a plurality of linear grooves disposed in parallel with each other on a surface orthogonal to said rotary shaft and orthogonal to said parting line;

a contact member provided between said rotary member and said grooves; and an urging member for urging said rotary member in contact with said contact member and for urging said contact member in contact with said ratcheting grooves.

2. A ratcheting device comprising:

a rotary member rotatable about a rotary axis;

a plurality of linear grooves disposed in parallel with each other and extending in a direction which is perpendicular to said rotary axis, said grooves being formed in parallel with a line lying orthogonal to said rotary axis and at a pitch which decreases as the distance of each groove from said rotary axis increases; and a contact member provided between said rotary member and said grooves with a pre-load urging said contact member against said grooves applied thereto.

3. A ratcheting device comprising:

a rotary member rotatable about a rotary axis;

a plurality of linear grooves disposed in parallel with each other and extending in a direction which is perpendicular to said rotary axis;

a contact member provided between said rotary member and said grooves with a pre-load urging said contact member against said grooves applied thereto;

a mold parting line lying perpendicular to the direction of said grooves.

4. A ratcheting device comprising:

a rotary member rotatable about a rotary axis;

a plurality of linear projections disposed in parallel with each other on a surface lying perpendicular to said rotary axis;

a contact member provided between said rotary member and said linear projections with a pre-load applied thereto; and a mold parting line formed on a base member which supports said rotary member, said parting line lying perpendicular to the direction in which said ratcheting projections extend.

5. A ratcheting device comprising:

a rotary member rotatable about a rotary axis;

a plurality of linear projections disposed in parallel with each other on a surface lying perpendicular to said rotary axis, said linear projections between formed in parallel with a line lying orthogonal to said rotary axis at a pitch which decreases as the distance of each projection from said rotary axis increases.

6. A ratcheting device for a camera, comprising:

an operating member that is manually rotatable;

a ratcheting member formed using molding having ratcheting groove portions or projections provided on a surface such that they are orthogonal to a parting line caused by molding; and a contact member sliding over said ratcheting groove portions or projections in contact therewith as said operating member is rotated.

7. A ratcheting device for a camera, comprising:
an operating member that is manually rotatable;
a ratcheting member formed using molding having ratcheting groove portions or projections provided on a surface at unequal intervals such that they are orthogonal to a parting line caused by molding; and
a contact member sliding over said ratcheting groove portions or projections in contact therewith as said operating member is rotated.

8. A ratcheting device for a camera according to claim 7, wherein said ratcheting grooves or projections of said ratcheting member are a plurality of grooves or projections in parallel with a shaft orthogonal to said parting line and wherein the pitch of the grooves or projections decreases as the distance thereof from said orthogonal shaft increases.

9. A ratcheting device for a camera, comprising:
an operating member that is manually rotatable;
a ratcheting member formed using molding having a plurality of ratcheting groove portions or projections provided on a surface of said ratcheting member at unequal intervals such that they are orthogonal to a parting line caused by molding; and
a contact member sliding over said ratcheting groove portions or projections in contact therewith along an arcuate locus as said operating member is rotated.

10. A ratcheting device for a camera according to claim 9, wherein said ratcheting grooves or projections of said ratcheting member are a plurality of grooves or projections in parallel with a shaft which passes through the center of rotation of said arcuate locus and which is orthogonal to said parting line and wherein the pitch of the ratcheting grooves or projections decreases as the distance thereof from said orthogonal shaft increases.

11. A ratcheting device comprising:
a rotary member rotatable about a rotary axis;
a base member for rotatably supporting said rotary member, said base member being formed using injection molding such that a parting line caused by the injection molding passes through the center of said rotary axis, said base member having ratcheting projections constituted by a plurality of linear projections disposed in parallel with each other on a surface orthogonal to said rotary axis and orthogonal to said parting line;
a contact member provided between said rotary member and the gaps between said projections; and
an urging member for urging said rotary member in contact with said contact member and for urging said contact member in contact with gaps located between said ratcheting projections.

12. A ratcheting device according to claim 11, wherein said urging member is a spring.

13. A ratcheting device comprising:
a rotary member rotatable about a rotary axis;
a base member for rotatably supporting said rotary member, said base member having a plurality of linear grooves disposed in parallel with each other on a surface of said base member, said linear grooves lying perpendicular to said rotary axis; and
a contact member provided between said rotary member and said grooves with a pre-load urging said contact member against said grooves applied thereto, said contact member sliding over said linear grooves along an arcuate locus as said rotary member is rotated about said rotary axis.

14. The ratcheting device according to claim 13, wherein said grooves are formed on a flat surface extending perpendicular to said rotary access.

15. A ratcheting device according to claim 13, wherein said rotary member urges said contact member against said grooves.

16. A ratcheting device according to claim 15, further including a spring for urging said rotary member against said contact member.

17. A ratcheting device comprising:
a rotary member rotatable about a rotary axis;
a base member for rotatably supporting said rotary member;
a plurality of linear projections provided on said base member and extending parallel to one another and in a direction perpendicular to said rotary axis; and
a contact member provided between said rotary member and said linear projections with a pre-load applied thereto which urges said contact member against said linear projections, said contact member sliding over said linear grooves along an arcuate locus as said rotary member is rotated about said rotary axis.

18. A ratcheting device according to claim 17, wherein said rotary member urges said contact member against said grooves.

19. A ratcheting device according to claim 18, further including a spring for urging said rotary member against said contact member.

20. A ratcheting device for a camera, comprising:
an operating member that is manually rotatable;
a molded ratcheting member having a plurality of linear grooves or projections lying in a common plane, said linear grooves or projections extending parallel to each other; and
a contact member sliding over said ratcheting groove portions or projections in contact therewith along an arcuate locus as said operating member is rotated.

21. A ratcheting device according to claim 20, wherein said operating member urges said contact member against said linear grooves.

22. A ratcheting device according to claim 21, further including a spring for urging said operating member against said contact member.

23. A ratcheting device for diopter adjustment of a camera, comprising:
an operating member that is manually rotatable;
a molded ratcheting member having a plurality of linear grooves or projections lying in a common plane and extending parallel to each other on a surface of said ratcheting member; and
a contact member sliding over said linear grooves or projections in contact therewith along an arcuate locus as said operating member is rotated.

24. A ratcheting device according to claim 23, wherein said operating member urges said contact member against said linear grooves.

25. A ratcheting device according to claim 24, further including a spring for urging said operating member against said contact member.

26. A ratcheting device comprising:
a rotary member rotatable about a rotary axis;
a plurality of linear grooves disposed in parallel with each other and extending in a direction which is perpendicular to said rotary axis; and
a contact member provided between said rotary member and said grooves with a pre-load urging said contact member against said grooves applied thereto, said contact member sliding over said linear grooves along an arcuate locus as said rotary member is rotated about said rotary axis.

27. A ratcheting device according to claim 26, wherein said grooves are provided on said rotary member.

28. A ratcheting device according to claim 26, wherein said grooves are provided on a base member which rotatably supports said rotary member.

29. A ratcheting device according to claim 26, wherein said contact member is a ball-shaped member.

30. The ratcheting device according to claim 26, wherein said grooves are formed on a flat surface extending perpendicular to said rotary access.

31. A ratcheting device according to claim 26, wherein said rotary member urges said contact member against said grooves.

32. A ratcheting device according to claim 31, further including a spring for urging said rotary member against said contact member.

33. A ratcheting device comprising:

a rotary member rotatable about a rotary axis;

a plurality of linear projections disposed in parallel with each other on a surface lying perpendicular to said rotary axis; and a contact member provided between said rotary member and said linear projections with a pre-load applied thereto, said contact member sliding over said linear grooves along an arcuate locus as said rotary member is rotated about said rotary axis.

34. A ratcheting device according to claim 33, wherein said linear projections are provided on said rotary member.

35. A ratcheting device according to claim 33, wherein said linear projections are provided on a base member which rotatably supports said rotary member.

36. A ratcheting device according to claim 33, wherein said contact member is a ball-shaped member.

37. A ratcheting device according to claim 33, wherein said rotary member urges said contact member against said linear projections.

38. A ratcheting device according to claim 37, further including a spring urging said rotary member against said contact member.

* * * * *

UNITED STATES PATENT AND TRADEMARK OFFICE
CERTIFICATE OF CORRECTION

PATENT NO.    : 6,430,374 B1
DATED         : August 6, 2002
INVENTOR(S)   : Hiroyuki Satake It is certified that error appears in the above-identified patent and that said Letters Patent is hereby corrected as shown below:

<u>Column 6,</u>
Line 55, change "between" to -- being --;

<u>Column 8,</u>
Line 3, change "access" to -- axis --;

<u>Column 9,</u>
Line 14, change "access" to -- axis --;

Signed and Sealed this

Eighteenth Day of February, 2003

JAMES E. ROGAN
*Director of the United States Patent and Trademark Office*